(12) United States Patent
Shiga et al.

(10) Patent No.: US 8,044,164 B2
(45) Date of Patent: Oct. 25, 2011

(54) GOLF BALL

(75) Inventors: Kazuyoshi Shiga, Kobe (JP); Takashi Sasaki, Kobe (JP); Mikio Yamada, Kobe (JP)

(73) Assignee: SRI Sports Limited, Kobe (JP)

( * ) Notice: Subject to any disclaimer, the term of this patent is extended or adjusted under 35 U.S.C. 154(b) by 401 days.

(21) Appl. No.: 12/324,582

(22) Filed: Nov. 26, 2008

(65) Prior Publication Data

US 2009/0143169 A1 Jun. 4, 2009

(30) Foreign Application Priority Data

Nov. 30, 2007 (JP) ................................ 2007-311172

(51) Int. Cl.
*A63B 37/12* (2006.01)
*A63B 37/00* (2006.01)
*C08G 18/75* (2006.01)

(52) U.S. Cl. .............................. 528/65; 528/76; 473/378
(58) Field of Classification Search .................. None
See application file for complete search history.

(56) References Cited

U.S. PATENT DOCUMENTS

| | | | |
|---|---|---|---|
| 3,789,032 A * | 1/1974 | Hoeschele ................. | 528/63 |
| 5,976,035 A | 11/1999 | Umezawa et al. | |
| 5,993,968 A | 11/1999 | Umezawa et al. | |
| 6,054,550 A | 4/2000 | Umezawa et al. | |
| 6,123,628 A | 9/2000 | Ichikawa et al. | |
| 6,476,176 B1 | 11/2002 | Wu | |
| 6,506,851 B2 | 1/2003 | Wu | |
| 6,569,037 B2 | 5/2003 | Ichikawa et al. | |
| 2003/0236381 A1 * | 12/2003 | Yokota ........................ | 528/65 |
| 2006/0017201 A1 * | 1/2006 | Wu et al. ..................... | 264/571 |
| 2008/0146765 A1 * | 6/2008 | Xie et al. .................... | 528/64 |

FOREIGN PATENT DOCUMENTS

| | | | |
|---|---|---|---|
| CA | 971184 | * | 7/1975 |
| JP | 9-271538 A | | 10/1997 |
| JP | 9-294830 A | | 11/1997 |
| JP | 10-248959 A | | 9/1998 |
| JP | 10-290849 A | | 11/1998 |
| JP | 10-290850 A | | 11/1998 |
| JP | 11-178949 A | | 7/1999 |
| JP | 2002-143345 A | | 5/2002 |
| JP | 2003-516832 A | | 5/2003 |
| JP | 2004-49914 A | | 2/2004 |
| JP | 2006-102507 A | | 4/2006 |
| JP | 2007-98140 A | | 4/2007 |

* cited by examiner

*Primary Examiner* — David Buttner
(74) *Attorney, Agent, or Firm* — Birch, Stewart, Kolasch & Birch, LLP

(57) ABSTRACT

A golf ball which has excellent abrasion-resistance and spin performance is provided. The golf ball of the present invention includes a core and a cover covering the core. The cover contains, as a resin component, polyurethane which is obtained using, as a polyisocyanate component constituting the polyurethane, 4,4'-dicyclohexylmethane diisocyanate having a mole ratio ((B)/(A)) of non-cis-structure molecule (B) to cis-structure molecule (A) in a range from 3/7 to 9/1.

13 Claims, No Drawings

GOLF BALL

FIELD OF THE INVENTION

The present invention relates to a golf ball which has excellent abrasion-resistance and spin performance.

DESCRIPTION OF THE RELATED ART

Conventionally, an ionomer resin is used as a resin component constituting the cover of a golf ball. However, a golf ball containing polyurethane as a resin component constituting the cover has been proposed (e.g. Japanese Patent Publication Nos. H10-248959 A, No. H09-294830 A, H11-178949 A, and H09-271538 A), because the golf ball has more excellent abrasion-resistance. In order to improve weather resistance in the golf ball using the polyurethane as the resin component constituting the cover, it has been proposed to use 4,4'-dicyclohexylmethane diisocyanate, a non-yellowing polyisocyanate, as a polyisocyanate component constituting the polyurethane (e.g. Japanese Patent Publication Nos. 2002-143345 A, H10-290849 A, H10-290850 A, No. 2006-102507 A, No. 2004-49914 A, No. 2003-516832, and No. 2007-98140).

SUMMARY OF THE INVENTION

However, if the polyurethane containing 4,4'-dicyclohexylmethane diisocyanate is used as the resin component constituting the cover, the golf ball has insufficient spin performance, although the abrasion-resistance is excellent. The present invention has been made in view of the above circumstances, and an object of the present invention is to provide a golf ball which has the excellent abrasion-resistance and spin performance.

The present invention which has solved the above problems provides a golf ball comprising:
a core; and
a cover covering the core and containing polyurethane as a resin component,
wherein the polyurethane is obtained using 4,4'-dicyclohexylmethane diisocyanate having a mole ratio ((B)/(A)) of non-cis-structure molecule (B) to cis-structure molecule (A) in a range from 3/7 to 9/1 as a polyisocyanate component constituting the polyurethane.

Use of 4,4'-dicyclohexylmethane diisocyanate having a mole ratio ((B)/(A)) of non-cis-structure molecule (B) to cis-structure molecule (A) in a range from 3/7 to 9/1, as the polyisocyanate component constituting the polyurethane contained in the cover, provides the golf ball with the abrasion-resistance and spin performance which are well-balanced.

The polyurethane is preferably obtained by using 4,4'-dicyclohexylmethane diisocyanate having a mole ratio ((B)/(A)) of non-cis-structure molecule (B) to cis-structure molecule (A) in a range from 5/5 to 7/3 as the polyisocyanate component constituting the polyurethane.

The polyisocyanate component preferably contains the 4,4'-dicyclohexylmethane diisocyanate in an amount of 5 mass % or higher.

The polyurethane preferably contains polytetramethylene ether glycol as a polyol component constituting the polyurethane. Further, the polyurethane preferably contains 1,4-butanediol as a chain extender component constituting the polyurethane.

According to the present invention, a golf ball which has the excellent abrasion-resistance and spin performance can be obtained.

DESCRIPTION OF THE PREFERRED EMBODIMENT

The present invention provides a golf ball comprising:
a core; and
a cover covering the core and containing polyurethane as a resin component,
wherein the polyurethane is obtained by using 4,4'-dicyclohexylmethane diisocyanate (hereinafter, may be referred to as "$H_{12}MDI$") having a mole ratio ((B)/(A)) of non-cis-structure molecule (B) to cis-structure molecule (A) in a range from 3/7 to 9/1 as a polyisocyanate component constituting the polyurethane.

First, the polyurethane contained as a resin component in the cover will be described in the following.

The polyurethane used in the present invention is obtained by using $H_{12}MDI$ having a mole ratio ((B)/(A)) of non-cis-structure molecule (B) to cis-structure molecule (A) in a range from 3/7 to 9/1 as the polyisocyanate component constituting the polyurethane.

The polyurethane is not limited, as long as the polyurethane is obtained by using the $H_{12}MDI$ having a mole ratio ((B)/(A)) of non-cis-structure molecule (B) to cis-structure molecule (A) in a range from 3/7 to 9/1 as the polyisocyanate component constituting the polyurethane and has a plurality of urethane bonds within the molecule. For example, the polyurethane is a reaction product which is obtained by reacting a polyisocyanate component with a polyol component to have urethane bonds formed within the molecule, where necessary, obtained by further carrying out a chain extension reaction with such a chain extender as a low-molecular weight polyol, a low-molecular weight polyamine or the like.

$H_{12}MDI$ has two cyclohexane rings within a molecule, and has three types of stereoisomers which have different binding positions of the methylene group and the isocyanate groups bonded to these cyclohexane rings with respect to planes of the respective rings. The three types of stereoisomers are cis,cis-$H_{12}MDI$ (the following Formula (1)) in which the binding positions of the methylene group and the isocyanate group with respect to the ring plane are on the same side in both cyclohexane rings, cis,trans-$H_{12}MDI$ (the following Formula (2)) in which the binding positions of the methylene group and the isocyanate group with respect to the ring plane are on the same side in one cyclohexane ring and on the opposite sides in the other cyclohexane ring, and trans,trans-$H_{12}MDI$ (the following Formula (3)) in which the binding positions of the methylene group and the isocyanate group with respect to the ring plane are on the opposite sides in both cyclohexane rings. Although cyclohexane rings include conformational stereoisomers such as chair conformation and boat conformation, it is considered that the conformational stereoisomers are averaged by ring inversion.

[Formula 1]

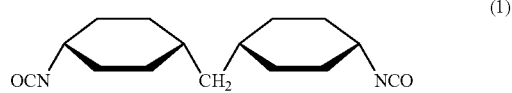

(1)

[Formula 2]

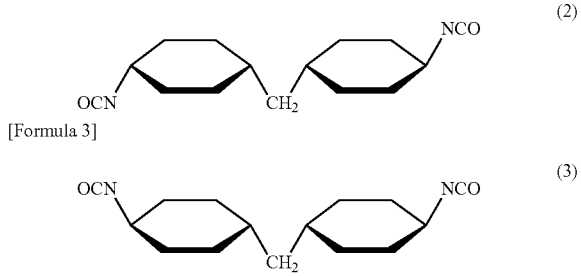

[Formula 3]

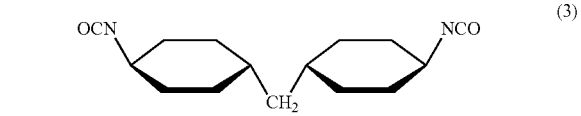

In the $H_{12}MDI$ used in the present invention, "cis-structure molecule" means cis,cis-$H_{12}MDI$ and cis,trans-$H_{12}MDI$, and "non-cis-structure molecule" means trans,trans-$H_{12}MDI$.

In the $H_{12}MDI$ used in the present invention, a mole ratio ((B)/(A)) of non-cis-structure molecule (B) to cis-structure molecule (A) is preferably 3/7 or larger, more preferably 4/6 or larger, and even more preferably 5/5 or larger. Further, the mole ratio ((B)/(A)) is preferably 9/1 or smaller, more preferably 8/2 or smaller, and even more preferably 7/3 or smaller. If the mole ratio ((B)/(A)) of non-cis-structure molecule (B) to cis-structure molecule (A) is smaller than 3/7, the desired spin performance may not be obtained. If the mole ratio ((B)/(A)) is larger than 9/1, the abrasion-resistance of the obtained golf ball may be lowered.

A method for obtaining the $H_{12}MDI$ having a mole ratio ((B)/(A)) of non-cis-structure molecule (B) to cis-structure molecule (A) in a range from 3/7 to 9/1 used in the present invention is not particularly limited. For example, $H_{12}MDI$ having a mole ratio ((B)/(A)) of non-cis-structure molecule (B) to cis-structure molecule (A) of 2/8 is used as the starting material to prepare $H_{12}MDI$ containing non-cis-structure molecules (B) in a large amount (e.g. in an amount of 90 mass % or higher) in a recrystallization method. The obtained $H_{12}MDI$, containing non-cis-structure molecules (B) in a large amount, is mixed with the $H_{12}MDI$ used as the starting material to obtain $H_{12}MDI$ having a desired mole ratio ((B)/(A)) of non-cis-structure molecule (B) to cis-structure molecule (A). The amount of non-cis-structure molecules (B) contained in the $H_{12}MDI$ can be measured by gas chromatography, or by similar methods.

In obtaining the polyurethane used in the present invention, a polyisocyanate other than the above $H_{12}MDI$ may be used as a polyisocyanate component, as long as it does not impair the effect of the present invention.

The other polyisocyanate component is not limited, as long as it has at least two isocyanate groups. Examples of the other polyisocyanate include an aromatic polyisocyanate such as 2,4-tolylene diisocyanate, 2,6-tolylene diisocyanate, a mixture of 2,4-tolylenediisocyanate and 2,6-tolylene diisocyanate (TDI), 4,4'-diphenylmethane diisocyanate (MDI), 1,5-naphthylene diisocyanate (NDI), 3,3'-bitolylene-4,4'-diisocyanate (TODI), xylylene diisocyanate (XDI), tetramethylxylylene diisocyanate (TMXDI), para-phenylene diisocyanate (PPDI); an alicyclic polyisocyanate or aliphatic polyisocyanate such as hydrogenated xylylenediisocyanate ($H_6XDI$), hexamethylene diisocyanate (HDI), isophorone diisocyanate (IPDI), and norbornene diisocyanate (NBDI). These may be used either alone or as a mixture of at least two of them.

In view of improving the abrasion-resistance, the aromatic polyisocyanate is preferably used. Use of the aromatic polyisocyanate improves the mechanical property of the obtained polyurethane and provides the cover with the excellent abrasion-resistance. In addition, in view of improving the weather resistance, as the polyisocyanate component of the thermoplastic polyurethane, a non-yellowing type polyisocyanate such as TMXDI, XDI, HDI, $H_6XDI$, IPDI, and NBDI is preferably used.

In the case that the other polyisocyanate component than $H_{12}MDI$ is used in addition to $H_{12}MDI$ as the polyisocyanate component, the content of $H_{12}MDI$ in the polyisocyanate component is preferably 5 mass % or more, more preferably 20 mass % or more, even more preferably 50 mass % or more. It is also a preferable embodiment that the polyisocyanate component essentially consists of $H_{12}MDI$.

The polyol component constituting the polyurethane is not limited, as long as it has a plurality of hydroxyl groups. The polyol is preferably a high molecular weight polyol. Such examples of the high molecular weight polyol include a polyether polyol such as polyoxyethylene glycol (PEG), polyoxypropylene glycol (PPG), and polyoxytetramethylene glycol (PTMG); a condensed polyester polyol such as polyethylene adipate (PEA), polybutylene adipate (PBA), and polyhexamethylene adipate (PHMA); a lactone polyester polyol such as poly-ε-caprolactone (PCL); a polycarbonate polyol such as polyhexamethylene carbonate; and an acrylic polyol. The above polyols may be used alone or as a mixture of at least two of them. Among them, preferably used is a polyether polyol such as polyoxyethylene glycol (PEG), polyoxypropylene glycol (PPG), and polyoxytetramethylene glycol (PTMG), more preferably polyoxytetramethylene glycol (PTMG).

A number average molecular weight of the high-molecular weight polyol is not particularly limited, and for example, it is preferably 400 or more, more preferably 1,000 or more. If the number average molecular weight of the high-molecular weight polyol is too small, the resultant polyurethane becomes too hard and the shot feeling of the golf ball is lowered. The upper limit of the number average molecular weight of the high molecular weight polyol is not particularly limited, and it is preferably 10,000, more preferably 5,000. The number average molecular weight of the polyol component can be measured by Gel permeation Chromatography using two columns of TSK-GEL SUPREH 2500 (TOSOH Corporation) as a column, polystyrene as a standard material, and tetrahydrofuran as an eluate.

The chain extender component which may constitute the thermoplastic polyurethane includes a low-molecular weight polyol, a low-molecular weight polyamine and the like. Examples of the low-molecular weight polyol may include a diol such as ethylene glycol, diethylene glycol, triethylene glycol, propanediol (e.g., 1,2-propanediol, 1,3-propanediol, and 2-methyl-1,3-propanediol), dipropylene glycol, butanediol (e.g., 1,2-butanediol, 1,3-butanediol, 1,4-butanediol, 2,3-butanediol, and 2,3-dimethyl-2,3-butanediol), neopentyl glycol, pentanediol, hexanediol, heptanediol, octanediol, 1,6-cyclohexanedimethylol, an aniline diol, and bisphenol A diol; a triol such as glycerin, trimethylol propane, and hexanetriol; a tetraol or a hexanol such as pentaerythritol and sorbitol. Among them, preferably used is a diol such as ethylene glycol, diethylene glycol, triethylene glycol, propanediol, dipropylene glycol, and butanediol, more preferably is used butanediol.

The low-molecular weight polyamine that can be used as a chain extender may include any polyamine, as long as it has at least two amino groups. The polyamine includes an aliphatic polyamine such as ethylenediamine, propylenediamine, butylenediamine, and hexamethylenediamine, an alicyclic polyamine such as isophoronediamine, piperazine, and an aromatic polyamine.

The aromatic polyamine has no limitation as long as it has at least two amino groups directly or indirectly bonded to an aromatic ring. Herein, the "indirectly bonded to the aromatic ring", for example, means that the amino group is bonded to the aromatic ring via a lower alkylene bond. Further, the aromatic polyamine includes, for example, a monocyclic aromatic polyamine having at least two amino groups bonded to one aromatic ring or a polycyclic aromatic polyamine having at least two aminophenyl groups each having at least one amino group bonded to one aromatic ring.

Examples of the monocyclic aromatic polyamine include a type such as phenylenediamine, tolylenediamine, diethyltoluenediamine, and dimethylthiotoluenediamine wherein amino groups are directly bonded to an aromatic ring; and a type such as xylylenediamine wherein amino groups are bonded to an aromatic ring via a lower alkylene group. Further, the polycyclic aromatic polyamine may include a poly(aminobenzene) having at least two aminophenyl groups directly bonded to each other or a compound having at least two aminophenyl groups bonded via a lower alkylene group or an alkylene oxide group. Among them, a diaminodiphenylalkane having two aminophenyl groups bonded to each other via a lower alkylene group is preferable. Typically preferred are 4,4'-diaminodiphenylmethane or the derivatives thereof.

The low-molecular weight polyol and low-molecular weight polyamine preferably has a molecular weight of 800 or less, more preferably 600 or less, even more preferably 400 or less.

The polyurethane has no limitation on the constitutional embodiments thereof. Examples of the constitutional embodiments are the embodiment where the polyurethane consists of the polyisocyanate component and the polyol component; the embodiment where the polyurethane consists of the polyisocyanate component, the polyol component and the low-molecular weight polyol component; and the embodiment where the polyurethane consists of the polyisocyanate component, the polyol component, the low-molecular weight polyol component, and the low-molecular weight polyamine component; and the embodiment where the polyurethane consists of the polyisocyanate component, the polyol component and the polyamine component. Among them, preferred is the embodiment where the polyurethane consists of the polyisocyanate component, the polyol component and the low-molecular weight polyol, and more preferred is the embodiment where the polyurethane consists of $H_{12}MDI$ as the polyisocyanate component, polytetramethylene ether glycol (PTMG) as the polyol component and 1,4-butanediol as the low-molecular weight polyol.

The polyurethane may be either thermoplastic polyurethane or thermosetting polyurethane. The thermoplastic polyurethane is polyurethane exhibiting plasticity by heating and generally means polyurethane having a straight chain structure of a high molecular weight to a certain extent. On the other hand, the thermosetting polyurethane (two-component curing type polyurethane) is polyurethane obtained by temporarily preserving a low-molecular weight urethane prepolymer, and reacting the prepolymer with a chain extender (curing agent) to increase a molecular weight thereof immediately before molding the cover. The thermosetting polyurethane includes polyurethane having a straight chain structure or polyurethane having a three-dimensional crosslinked structure depending on a number of a functional group of the prepolymer or the chain extender (curing agent) to be used. In the present invention, the thermoplastic polyurethane is preferable.

The polyurethane can be produced by appropriately combining the polyisocyanate component, the polyol component, and the chain extender component. Examples of a method for synthesizing the polyurethane include a one-shot method and a prepolymer method. The one-shot method is a method in which a polyisocyanate component and a polyol component react each other at once. The prepolymer method is a method in which a polyisocyanate component and a polyol component react each other in multiple steps; for example, first a low-molecular-weight urethane prepolymer is synthesized, and then the urethane prepolymer is subsequently polymerized to have a high-molecular weight. The polyurethane used in the present invention is preferably produced by the prepolymer method.

As an example of producing the polyurethane by the prepolymer method, the following case will be describe in detail, where an isocyanate group terminated urethane prepolymer is synthesized and then polymerized with a low-molecular-weight polyol.

First, a polyisocyanate component containing the $H_{12}MDI$ is subjected to a urethane reaction with a polyol component to synthesize an isocyanate group terminated urethane prepolymer. In this case, the charging ratio of the polyisocyanate component to the polyol component is, preferably 1 or larger, more preferably 1.2 or larger, and even more preferably 1.5 or larger, and is preferably 10 or smaller, more preferably 9 or smaller, and even more preferably 8 or smaller in a molar ratio (NCO/OH) of the isocyanate group (NCO) contained in the polyisocyanate component to the hydroxyl group (OH) contained in the polyol component.

The temperature at which the urethane reaction is performed is preferably 10° C. or higher, more preferably 30° C. or higher, and even more preferably 50° C. or higher, and preferably 200° C. or lower, more preferably 150° C. or lower, and even more preferably 100° C. or lower. The reaction time for the urethane reaction is preferably 10 minutes or longer, more preferably 1 hour or longer, and even more preferably 3 hours or longer, and is preferably 32 hours or shorter, more preferably 16 hours or shorter, and even more preferably 8 hours or shorter.

Next, the obtained isocyanate group terminated urethane prepolymer is subjected to a chain extension reaction with a chain extender component to obtain the polyurethane. In this case, the charging ratio of the isocyanate group terminated urethane prepolymer to the chain extender component is preferably 0.9 or larger, more preferably 0.92 or larger, and even more preferably 0.95 or larger, and preferably 1.1 or smaller, more preferably 1.08 or smaller, and even more preferably 1.05 or smaller in a molar ratio (NCO/OH) of the isocyanate group (NCO) contained in the isocyanate group terminated urethane prepolymer to the hydroxyl group (OH) contained in the chain extender component.

The temperature at which the chain extension reaction is performed is preferably 10° C. or higher, more preferably 30° C. or higher, and even more preferably 50° C. or higher, and preferably 220° C. or lower, more preferably 170° C. or lower, and even more preferably 120° C. or lower. The reaction time for the chain extension reaction is preferably 10 minutes or longer, more preferably 30 minutes or longer, and even more preferably 1 hour or longer, and preferably 20 days or shorter, more preferably 10 days or shorter, and even more preferably 5 days or shorter.

In synthesizing the polyurethane, a known catalyst may be used as long as it does not impair the effect of the present invention. Examples of the catalyst include a monoamine such as triethylamine, and N,N-dimethylcyclohexylamine; a polyamine such as N,N,N',N'-tetramethylethylenediamine, and N,N,N',N'',N''-pentamethyldiethylenetriamine; a cyclic diamine such as 1,8-diazabicyclo-[5.4.0]-7-undecene (DBU), triethylenediamine; a tin-based catalyst such as dibutyl tin dilaurylate, and dibutyl tin diacetate. Each of these catalysts may be used solely, or two or more of these catalysts may be used in combination. Among these catalysts, a tin-based catalyst such as dibutyl tin dilaurylate, and dibutyl tin diacetate are preferable, and in particular, dibutyl tin dilaurylate is preferably used.

A mole ratio ((B)/(A)) of non-cis-structure molecule (B) to cis-structure molecule (A) in the $H_{12}MDI$ used as the isocyanate component constituting the synthesized polyurethane can be measured as follows. The polyurethane is subjected to a treatment with a DMF solution containing n-butylamine or a heat treatment to break urethane bonds in the polyurethane, and the resulting material is analyzed by gas chromatography, or other similar methods.

A concentration of n-butylamine in the DMF solution preferably ranges from 0.01 mol/l to 0.25 mol/l, and is more preferably 0.05 mol/l. The heat treatment is preferably performed, for example, at a temperature ranging from 130° C. to 150° C. for a time period ranging from 2 hours to 4 hours.

Herein, the thermoplastic polyurethane containing $H_{12}MDI$ as the polyisocyanate component and used for the cover of the conventional golf ball includes, for example, "Elastollan (registered trademark) XNY97A" available from BASF Japan Ltd. However, $H_{12}MDI$ used as the polyisocyanate component of the polyurethane of "Elastollan (registered trademark) XNY97A" does not satisfy the mole ratio ((B)/(A)) of non-cis-structure molecule (B) to cis-structure molecule (A) defined in the present invention.

The cover of the present invention may contain other resin components in addition to the polyurethane as a resin component, as long as it does not impair the effect of the present invention. Examples of the other resin component include an ionomer resin, a thermoplastic elastomer, a diene block copolymer, or the like.

Examples of the ionomer resin include one prepared by neutralizing at least a part of carboxyl groups in a copolymer, composed of ethylene and α,β-unsaturated carboxylic acid having a carbon number of 3 to 8 with a metal ion; one prepared by neutralizing at least a part of carboxyl groups in a terpolymer composed of ethylene, α,β-unsaturated carboxylic acid having a carbon number of 3 to 8, and α,β-unsaturated carboxylic acid ester with a metal ion; and a mixture of these two. Examples of the α,β-unsaturated carboxylic acid include acrylic acid, methacrylic acid, fumaric acid, maleic acid, crotonic acid, or the like. In particular, acrylic acid and methacrylic acid are preferable. Examples of the α,β-unsaturated carboxylic acid ester include methyl ester, ethyl ester, propyl ester, n-butyl ester, isobutyl ester of acrylic acid, methacrylic acid, fumaric acid, and maleic acid. In particular, acrylic acid ester and methacrylic acid ester are preferable. Examples of the metal ion for neutralizing at least a part of the carboxyl groups in the copolymer composed of ethylene and the α,β-unsaturated carboxylic acid or in the terpolymer composed of ethylene, the α,β-unsaturated carboxylic acid, and the α,β-unsaturated carboxylic acid ester are; alkali metal ions such as sodium, potassium, and lithium; divalent metal ions such as magnesium, calcium, zinc, barium, and cadmium; trivalent metal ions such as aluminum, or other metal ions such as tin and zirconium. In particular, sodium ion, zinc ion, and magnesium ion are preferably used in view of the resilience and durability of the golf ball.

Specific examples of the ionomer resin include "Himilan (registered trade mark)" available from MITSUI-DUPONT POLYCHEMICAL CO., LTD, "Surlyn (registered trade mark)" available from DUPONT CO, and "Iotek (registered trade mark)" available from Exxon Co.

Specific examples of the thermoplastic elastomer includes a thermoplastic polyamide elastomer having a commercial name of "PEBAX", for example, "PEBAX 2533", available from ARKEMA Inc; a thermoplastic polyester elastomer having a commercial name of "HYTREL", for example, "HYTREL 3548" and "HYTREL 4047" available from DU PONT-TORAY Co.; a thermoplastic polyurethane elastomer having a commercial name of "ELASTOLLAN", for example, "ELASTOLLAN XNY97A" available from BASF Japan; and a thermoplastic polystyrene elastomer having a commercial name of "Rabalon" available from Mitsubishi Chemical Co. Among them, the thermoplastic polystyrene elastomer is preferable. The thermoplastic polystyrene elastomer includes, for example, a polystyrene-diene block copolymer comprising a polystyrene block component as a hard segment and a diene block component, for example polybutadiene, isoprene, hydrogenated polybutadiene, hydrogenated polyisoprene, as a soft segment. The polystyrene-diene block copolymer comprises a double bond derived from a conjugated diene compound of block copolymer or hydrogenated block copolymer. Examples of the polystyrene-diene block copolymer are a block copolymer having a SBS (styrene-butadiene-styrene) comprising polybutadiene block; and a block copolymer having a SIS (styrene-isoprene-styrene) structure.

When such a resin component as the ionomer resin is used for the cover of the present invention besides the polyurethane, the resin component preferably contains the polyurethane as the main component. The resin component preferably contains the polyurethane in an amount of 50 mass % or higher, more preferably 60 mass % or higher, and even more preferably 70 mass % or higher. Further, it is also preferable that the resin component essentially consists of the polyurethane.

The cover composition used in the golf ball of the present invention may contain a pigment component such as zinc oxide, titanium oxide and a blue pigment, a gravity adjusting agent such as calcium carbonate and barium sulfate, a dispersant, an antioxidant, an ultraviolet absorber, a light stabilizer, a fluorescent material or a fluorescent brightener, other than the above-mentioned resin component, to the extent that the cover performance is not damaged.

The content of the white pigment (titanium oxide) is preferably 0.5 part by mass or more, more preferably 1 part by mass or more, and preferably 10 parts by mass or less, more preferably 8 parts by mass or less based on 100 parts by mass of the thermoplastic polyurethane (A) constituting the cover. The white pigment in an amount of 0.5 part by mass or more can impart opacity to the cover, while the white pigment in an amount of more than 10 parts by mass may lower the durability of the resulting cover.

The cover of the golf ball of the present invention can be prepared by molding the cover composition containing the above mentioned polyurethane as a resin component. An embodiment for molding a cover is not particularly limited, and includes an embodiment which comprises injection molding the cover composition directly onto the core, or an embodiment which comprises molding the cover composition into a hollow-shell, covering the core with a plurality of the hollow-shells and subjecting the core with a plurality of the hollow shells to the compression-molding (preferably an embodiment which comprises molding the cover composition into a half hollow-shell, covering the core with the two half hollow-shells, and subjecting the core with the two half hollow-shells to the compression-molding).

Molding of the half shell can be performed by either compression molding method or injection molding method, and the compression molding method is preferred. The compression-molding of the cover composition into half shell can be carried out, for example, under a pressure of 1 MPa or more and 20 MPa or less at a temperature of −20° C. or more and 70° C. or less relative to the flow beginning temperature of the cover composition. By performing the molding under the above conditions, a half shell having a uniform thickness can be formed. Examples of a method for molding the cover using half shells include compression molding by covering the core with two half shells. The compression molding of half shells into the cover can be carried out, for example, under a pressure of 0.5 MPa or more and 25 MPa or less at a temperature of −20° C. or more and 70° C. or less relative to the flow beginning temperature of the cover composition. By performing the molding under the above conditions, a cover for a golf ball having a uniform thickness can be formed.

In the present invention, the cover can be formed by injection molding the cover composition directly onto the core. In the case that the cover composition is subjected to direct injection molding onto the core, it is preferred to use upper and lower molds for forming a cover having a spherical cavity and pimples, wherein a part of the pimple also serves as a retractable hold pin. When forming the cover by injection molding, the hold pin is protruded to hold the core, and the cover composition which has been heated and melted is charged and then cooled to obtain a cover. For example, the cover composition heated and melted at the temperature of 150° C. to 250° C. is charged into a mold held under the pressure of 9 MPa to 15 MPa for 0.5 to 5 second. After cooling for 10 to 60 seconds, the mold is opened and the golf ball with the cover molded is taken out from the mold.

When molding a cover, the concave portions called "dimple" are usually formed on the surface. After the cover is molded, the mold is opened and the golf ball body is taken out from the mold, and as necessary, the golf ball body is preferably subjected to surface treatment such as deburring, cleaning, and sandblast. If desired, a paint film or a mark may be formed. The paint film preferably has a thickness of, but not limited to, 5 μm or larger, and more preferably 7 μm or larger, and preferably has a thickness of 25 μm or smaller, and more preferably 18 μm or smaller. This is because if the thickness is smaller than 5 μm, the paint film is easy to wear off due to continued use of the golf ball, and if the thickness is larger than 25 μm, the effect of the dimples is reduced, resulting in deteriorating flying performance of the golf ball.

In the present invention, the cover of the golf ball has a thickness of preferably 1.0 mm or smaller, more preferably 0.6 mm or smaller, and even more preferably 0.5 mm or smaller. This is because reducing the thickness of the cover equal to or smaller than 1.0 mm allows the core to have a larger outer diameter, thereby improving the resilience of the golf ball. The lower limit of the thickness of the cover is preferably, but not limited to, 0.3 mm. It the lower limit is smaller than 0.3 mm, it may become difficult to mold the cover.

The cover preferably has a slab hardness of 20 or larger, more preferably 25 or larger, and preferably has a slab hardness of 50 or smaller, and more preferably 45 or smaller in shore D hardness. If the cover hardness is smaller than 20 in shore D hardness, the resilience of the golf ball is likely to be low, thereby decreasing the flight distance of the golf ball. On the other hand, if the cover hardness is larger than 50, the durability of the obtained golf ball is likely to be low. For measuring the slab hardness of the cover, using the cover composition, a sheet having a thickness of about 2 mm were prepared by hot press molding and preserved at the temperature of 23° C. for two weeks. Three or more of the sheets were stacked on one another to avoid being affected by the measuring substrate on which the sheets were placed, and the stack was subjected to the measurement using the Shore D type spring hardness tester prescribed by ASTM-D2240.

Next, a preferred embodiment of the core of the golf ball of the present invention will be explained. The core of the golf ball of the present invention includes a single-layered core, a core consisting of a center and a single-layered intermediate layer covering the core, a core consisting of a center and multi-piece or multi-layer of intermediate layers covering the center. The core preferably has a spherical shape. If the core does not have a spherical shape, the cover does not have a uniform thickness. As a result, there exist some portions where the performance of the cover is lowered. On the other hand, the center generally has the spherical shape, but the center may be provided with a rib on the surface thereof so that the surface of the spherical center is divided by the ribs, preferably the surface of the spherical center is evenly divided by the ribs. In one embodiment, the ribs are preferably formed on the surface of the spherical center in an integrated manner, and in another embodiment, the ribs are formed as an intermediate layer on the surface of the spherical center.

The ribs are preferably formed along an equatorial line and meridians that evenly divide the surface of the spherical center, if the spherical center is assumed as the earth. For example, if the surface of the spherical center is evenly divided into 8, the ribs are formed along the equatorial line, any meridian as a standard, and meridians at the longitude 90 degrees east, longitude 90 degrees west, and the longitude 180 degrees east (west), assuming that the meridian as the standard is at longitude 0 degrees. If the ribs are formed, the depressed portion divided by the ribs are preferably filled with a plurality of intermediate layers or with a single-layered intermediate layer that fills each of the depressed portions to make a core in the spherical shape. The shape of the ribs, without limitation, includes an arc or an almost arc (for example, a part of the arc is removed to obtain a flat surface at the cross or orthogonal portions thereof).

The core or the center of the golf ball of the present invention, is preferably molded by, for example, heat-pressing a rubber composition (hereinafter, simply referred to as "core rubber composition" occasionally) containing a base rubber, a crosslinking initiator, a co-crosslinking agent, and where necessary a filler.

As the base rubber, a natural rubber or a synthetic rubber can be used. Such examples include a polybutadiene rubber, a natural rubber, a polyisoprene rubber, a styrene polybutadiene rubber, and ethylene-propylene-diene terpolymer (EPDM). Among them, typically preferred is the high cis-polybutadiene having cis-1,4 bond in a proportion of 40% or more, more preferably 70% or more, even more preferably 90% or more in view of its superior repulsion property.

The crosslinking initiator is blended to crosslink the base rubber component. As the crosslinking initiator, an organic peroxide is preferably used. Examples of the organic peroxide for use in the present invention are dicumyl peroxide, 1,1-bis(t-butylperoxy)-3,5-trimethylcyclohexane, 2,5-dimethyl-2,5-di(t-butylperoxy)hexane, and di-t-butyl peroxide. Among them, dicumyl peroxide is preferable. An amount of the crosslinking initiator to be blended in the rubber composition is preferably 0.2 part by mass or more, more preferably 0.3 part by mass or more, and preferably 3 parts by mass or less, more preferably 2 parts by mass or less based on 100 parts by mass of the base rubber. If the amount is less than 0.2 part by mass, the core becomes too soft, and the resilience tends to be lowered, and if the amount is more than 3 parts by mass, the amount of co-crosslinking agent needs to be increased in order to obtain an appropriate hardness, so that the resilience tends to be insufficient.

The co-crosslinking agent is not particularly limited as long as it has the effect of crosslinking a rubber molecule by graft polymerization with a base rubber molecular chain; for example, α,β-unsaturated carboxylic acid having 3 to 8 carbon atoms or a metal salt thereof, more preferably acrylic acid, methacrylic acid or a metal salt thereof may be used. As the metal constituting the metal salt, for example, zinc, magnesium, calcium, aluminum and sodium may be used, and among them, zinc is preferred because it provides high resilience.

The amount of the co-crosslinking agent to be used is preferably 10 parts or more, more preferably 20 parts or more, and is preferably 50 parts or less, more preferably 40 parts or less based on 100 parts of the base rubber by mass. If the amount of the co-crosslinking agent to be used is less than 10 parts by mass, the amount of the organic peroxide must be increased to obtain an appropriate hardness which tends to lower the resilience. On the other hand, if the amount of the co-crosslinking agent to be used is more than 50 parts by mass, the core becomes too hard, so that the shot feeling may be lowered.

The filler contained in the core rubber composition is mainly blended as a gravity adjusting agent in order to adjust the specific gravity of the golf ball obtained as the final product in the range of 1.0 to 1.5, and may be blended as required. Examples of the filler include an inorganic filler such as zinc oxide, barium sulfate, calcium carbonate, magnesium oxide, tungsten powder, and molybdenum powder. The amount of the filler to be blended in the rubber composition is preferably 2 parts or more, more preferably 3 parts or more, and preferably 50 parts or less, more preferably 35 parts or less based on 100 parts of the base rubber by mass. If the amount of the filler to be blended is less than 2 parts by mass, it becomes difficult to adjust the weight, while if it is more than 50 parts by mass, the weight ratio of the rubber component becomes small and the resilience tends to be lowered.

As the core rubber composition, an organic sulfur compound, an antioxidant or a peptizing agent may be blended as appropriate in addition to the base rubber, the crosslinking initiator, the co-crosslinking agent and the filler.

As the organic sulfur compound, a diphenyl disulfide or a derivative thereof may be preferably used. Examples of the diphenyl disulfide or the derivative thereof include diphenyl disulfide, a mono-substituted diphenyl disulfide such as bis(4-chlorophenyl)disulfide, bis(3-chlorophenyl)disulfide, bis(4-bromophenyl)disulfide, bis(3-bromophenyl)disulfide, bis(4-fluorophenyl)disulfide, bis(4-iodophenyl)disulfide and bis(4-cyanophenyl)disulfide; a di-substituted diphenyl disulfide such as bis(2,5-dichlorophenyl)disulfide, bis(3,5-dichlorophenyl)disulfide, bis(2,6-dichlorophenyl)disulfide, bis(2,5-dibromophenyl)disulfide, bis(3,5-dibromophenyl)disulfide, bis(2-chloro-5-bromophenyl)disulfide, and bis(2-cyano-5-bromophenyl)disulfide; a tri-substituted diphenyl disulfide such as bis(2,4,6-trichlorophenyl)disulfide, and bis(2-cyano-4-chloro-6-bromophenyl)disulfide; a tetra-substituted diphenyl disulfide such as bis(2,3,5,6-tetra chlorophenyl)disulfide; a penta-substituted diphenyl disulfide such as bis(2,3,4,5,6-pentachlorophenyl)disulfide and bis(2,3,4,5,6-pentabromophenyl)disulfide. These diphenyl disulfides or the derivative thereof can enhance resilience by having some influence on the state of vulcanization of vulcanized rubber. Among them, diphenyl disulfide and bis(pentabromophenyl) disulfide are preferably used since a golf ball having particularly high resilience can be obtained. The amount of the diphenyl disulfide or the derivative thereof to be blended is preferably 0.1 part by mass or more, more preferably 0.3 part by mass or more, and preferably 5.0 parts by mass or less, more preferably 3.0 parts by mass or less relative to 100 parts by mass of the base rubber.

The amount of the antioxidant to be blended is preferably 0.1 part or more and is preferably 1 part or less based on 100 parts of the base rubber by mass. Further, the amount of the peptizing agent is preferably 0.1 part or more and is preferably 5 parts or less based on 100 parts of the base rubber by mass.

The conditions for press-molding the rubber composition should be determined depending on the rubber composition. The press-molding is preferably carried out for 10 to 60 minutes at the temperature of 130 to 200° C. Alternatively, the press-molding is preferably carried out in a two-step heating, for example, for 20 to 40 minutes at the temperature of 130 to 150° C., and continuously for 5 to 15 minutes at the temperature of 160 to 180° C.

The core used in the golf ball of the present invention preferably has a diameter of 39 mm or larger, more preferably 39.5 mm or larger, and even more preferably 40.8 mm or larger, and preferably has a diameter of 42.2 mm or smaller, more preferably 42 mm or smaller, and even more preferably 41.8 mm or smaller. If the diameter of the core is smaller than the above lower limit, the cover becomes so thick that the resulting golf ball would have reduced resilience. On the other hand, if the diameter of the core is larger than the above upper limit, the cover becomes so thin that it is difficult to mold a cover on the surface.

It is preferable that the core of the present invention has a larger surface hardness than the center hardness (when the core consists of multiple layers, it is preferable that the surface hardness of the outermost layer is larger than the center hardness). Making the surface hardness of the core larger than the center hardness increases the launch angle and decreases the amount of spin, thereby improving the flight distance of the golf ball. In this respect, the hardness difference between the surface and the center of the core in the golf ball of the present invention is preferably 15 or larger, more preferably 20 or larger, and preferably 40 or smaller, more preferably 35 or smaller in Shore D. If the hardness difference is smaller than the above lower limit, the flight distance of the golf ball tends to be lower because it is difficult to obtain a high launch angle and a low spin rate. Further, it would be difficult to obtain a soft and good shot feeling because of the large impact that happens when hitting the golf ball. On the other hand, if the hardness difference is larger than the above upper limit, durability of the golf ball tends to be lower.

The center hardness of the core is preferably 30 or larger, more preferably 32 or larger, and even more preferably 35 or larger, and is preferably 50 or smaller, more preferably 48 or smaller, and even more preferably 45 or smaller in Shore D. If the center hardness is smaller than the above lower limit, the core becomes so soft that the resilience of the golf ball tends to be lower. On the other hand, if the center hardness is larger than the above upper limit, the core becomes so hard that the shot feeling deteriorates and the launch angle decreases, and the flying performance of the golf ball deteriorates due to an increased amount of spin. In the present invention, the center hardness of the core is the hardness measured with the Shore D type spring hardness tester at the central point of a cut plane of a core which has been cut into two halves.

The surface hardness of the core is preferably 45 or larger, more preferably 50 or larger, and even more preferably 55 or larger, and is preferably 65 or smaller, more preferably 62 or smaller, and even more preferably 60 or smaller in shore D hardness. If the surface hardness is smaller than the above lower limit, the core becomes so soft that the resilience of the golf ball and the launch angle may be decreased, and the flying performance of the golf ball may deteriorate due to an increased amount of spin. On the other hand, if the surface hardness is larger than the above upper limit, the core becomes so hard that the shot feeling may deteriorate. In the present invention, the surface hardness of the core is the hardness measured with the Shore D type spring hardness tester on the surface of the spherical core. Further, if the core consists of multiple layers, the surface hardness of the core means a surface hardness of the outermost layer of the core.

When the core of the golf ball of the present invention is a core consisting of a center and a single intermediate layer covering the center, or a core consisting of a center and a multi-piece or a multi-layer of intermediate layers covering the center, the core rubber composition can be used as a material for the center. In this case, the center preferably has a diameter of 30 mm or larger, more preferably 32 mm or larger, and preferably has a diameter of 41 mm or smaller, and more preferably 40.5 mm or smaller. If the diameter of the center is smaller than 30 mm, the thickness of the intermediate layer or the cover needs to be thicker than the desired thickness, resulting in the reduction of the resilience of the golf ball. On the other hand, if the diameter of the center is larger than 41 mm, the thickness of the intermediate layer or the cover needs to be thinner than the desired thickness, and the intermediate layer or the cover may not function well.

As a material of the intermediate layer, for example, a thermoplastic polyamide elastomer having a commercial name of "PEBAX", for example, "PEBAX 2533", available from ARKEMA Inc; a thermoplastic polyester elastomer having a commercial name of "HYTREL", for example, "HYTREL 3548" and "HYTREL 4047" available from DU PONT-TORAY Co.; a thermoplastic polyurethane elastomer having a commercial name of "ELASTOLLAN", for example, "ELASTOLLAN XNY97A" available from BASF Japan; and a thermoplastic polystyrene elastomer having a commercial name of "Rabalon" available from Mitsubishi Chemical Co. may be used in addition to the cured product of the rubber composition and the conventional ionomer resins. Examples of the ionomer resin include an ionomer resin prepared by neutralizing at least a part of carboxyl groups in a copolymer composed of ethylene and α,β-unsaturated carboxylic acid having 3 to 8 carbon atoms with a metal ion, one prepared by neutralizing at least a part of carboxyl groups in a ternary copolymer composed of ethylene, α,β-unsaturated carboxylic acid having 3 to 8 carbon atoms and α,β-unsaturated carboxylic acid ester with a metal ion, or a mixture thereof.

Specific examples of the ionomer resins include, but not limited to, Himilan 1555 (Na), Himilan 1557 (Zn), Himilan 1605 (Na), Himilan 1706 (Zn), Himilan 1707 (Na), Himilan AM7311 (Mg), and examples of the ternary copolymer ionomer resin include Himilan 1856 (Na) and Himilan 1855 (Zn) available from MITSUI-DUPONT POLYCHEMICAL CO., LTD.

Further, ionomer resins available from DUPONT CO. include Surlyn 8945 (Na), Surlyn 9945 (Zn), Surlyn 8140 (Na), Surlyn 8150 (Na), Surlyn 9120 (Zn), Surlyn 9150 (Zn), Surlyn 6910 (Mg), Surlyn 6120 (Mg), Surlyn 7930 (Li), Surlyn 7940 (Li), Surlyn AD8546 (Li), and examples of the ternary copolymer ionomer resin include Surlyn 8120 (Na) Surlyn 8320 (Na), Surlyn 9320 (Zn), and Surlyn 6320 (Mg).

Ionomer resins such as Iotek 8000 (Na), Iotek 8030 (Na), Iotek 7010 (Zn), and Iotek 7030 (Zn) are available from Exxon Co. Examples of the ternary copolymer ionomer resin include Iotek 7510 (Zn) and Iotek 7520 (Zn). The ionomer resins exemplified above can be used alone, or as a mixture of two or more.

Na, Zn, K, Li, or Mg described in the parentheses after the commercial name of the ionomer resin represents a kind of metal used for neutralization.

An embodiment for molding the intermediate layer is not particularly limited, and includes an embodiment which comprises injection molding the intermediate layer composition directly onto the center, or an embodiment which comprises molding the intermediate layer composition into a half hollow-shell, covering the center with the two hollow-shells and subjecting the center with the two hollow shells to the compression-molding.

The intermediate layer of the golf ball of the present invention preferably has a slab hardness of 40 or larger, more preferably 45 or larger, and even more preferably 50 or larger, and preferably has a slab hardness of 80 or smaller, more preferably 70 or smaller, and even more preferably 65 or smaller in Shore D hardness. Making the slab hardness of the intermediate layer equal to or larger than 40 in shore D hardness contributes to the core having the higher degree of "hard outer and soft inner" structure, thereby providing a high launch angle and a small amount of spin and hence achieving a large flight distance of the gold ball. On the other hand, making the slab hardness of the intermediate layer equal to or smaller than 80 in shore D hardness provides an excellent shot feeling as well as improves the spin performance of the golf ball, thereby improving controllability of the golf ball. Herein, the slab hardness of the intermediate layer is the measured hardness of a sheet of the intermediate layer composition, and is measured by a later-described measuring method. The slab hardness of the intermediate layer can be adjusted, for example, by appropriately selecting a combination of the above resin component and the rubber material and the amount of additives.

The golf ball of the present invention is not particularly limited on a structure thereof as long as the golf ball includes a core and a cover. Examples of the golf ball of the present invention include a two-piece golf ball including a core, and a cover covering the core; a three-piece golf ball including a core consisting of a center and an intermediate layer covering the center, and a cover covering the core; a multi-piece golf ball including a core consisting of a center and a multi-piece or multi-layer of intermediate layers covering the center, and a cover covering the core; and a wound golf ball including a wound core, and a cover covering the wound core.

When preparing a wound golf ball in the present invention, a wound core may be used as the core. In that case, for example, a wound core comprising a center formed by curing the above rubber composition for the core and a rubber thread layer which is formed by winding a rubber thread around the center in an elongated state can be used. In the present invention, the rubber thread, which is conventionally used for winding around the center, can be adopted for winding around the center. The rubber thread, for example, is obtained by vulcanizing a rubber composition including a natural rubber, or a mixture of a natural rubber and a synthetic polyisoprene, a sulfur, a vulcanization auxiliary agent, a vulcanization accelerator, and an antioxidant. The rubber thread is wound around the center in elongation of about 10 times length to form the wound core.

EXAMPLES

The following examples illustrate the present invention, however these examples are intended to illustrate the invention and are not to be construed to limit the scope of the present invention. Many variations and modifications of such examples will exist without departing from the scope of the inventions. Such variations and modifications are intended to be within the scope of the invention.

[Evaluation Methods]
(1) Abrasion-Resistance

A commercially available sand wedge was installed on a swing robot available from Golf Laboratories, Inc., and two points of a ball were both hit once at a head speed of 36 m/sec to observe the portions which were hit. Each hit portion was evaluated and ranked into eight levels based on the following criteria, and an average rank score for the two points was calculated. A smaller score indicates higher abrasion-resistance.

0 point: No hitting marks were observed.

1 point: Dot-like peeling (a maximum size is smaller than 3 mm) was observed.

2 point: Dot-like peeling (a maximum size is 3 mm or larger) was observed.

3 point: Line-like peeling (a maximum size is 5 mm or larger) was observed.

4 point: Clear line-like peeling (a maximum size is 5 mm or larger) was observed.

5 point: Deep and wide line-like peeling (a maximum size is 5 mm or larger) was observed.

6 point: Deep and wide peeling which was almost a plane was observed.

7 point: A part of the cover was scraped away as a plane.

(2) Amount of Spin

An approach wedge (SRIXON I-302 available from SRI Sports Limited) was installed on a swing robot available from Golf Laboratories, Inc. A golf ball was hit at ahead speed of 21 m/sec., and a sequence of photographs of the hit golf ball was taken for measuring spin rate (rpm). The measurement was performed ten times for each golf ball, and the average value is regarded as the spin rate (rpm).

[Production of the $H_{12}MDI$]

Desmodur (registered trademark) W was kept at a temperature of 3 to 4° C. for 91 hours, and then filtered at room temperature for 4 hours using a Büchner funnel. The substance left on the funnel was collected, placed into a flask, and heated to a temperature of 90° C. to be completely melted. Then, the melted substance was gradually cooled down to a temperature of 45° C. for 10 hours, kept at a temperature of 45° C. for 8 hours, and further gradually cooled down to a room temperature for 24 hours. The substance which had been gradually cooled down to a room temperature was filtered for 3 hours using a Büchner funnel. The substance left on the funnel was placed into a flask, and kept for 1 hour after being heated to a temperature of 70° C. Then, the fluid component was discarded. Further, after being heated to a temperature of 80° C., the substance was kept for 1 hour, and then the fluid component was discarded, thereby obtaining $H_{12}MDI$ containing non-cis-structure molecules (B) in an amount of 95 mass %. The obtained $H_{12}MDI$ containing non-cis-structure molecules (B) in an amount of 95 mass % was mixed with Desmodur (registered trademark) W to prepare $H_{12}MDI$ having a mole ratio ((B)/(A)) of non-cis-structure molecule (B) to cis-structure molecule (A) as shown in Table 1. An amount of trans,trans-$H_{12}MDI$ in the whole $H_{12}MDI$ was measured using gas chromatography equipment (model number "GC-2010" available from Shimadzu Corporation) under the following conditions.

(Measuring Conditions of Gas Chromatography)

Column: DB-1 (available from Shimadzu Corporation), 30 m×0.25 mm×0.25 μm.

Temperature: Kept at 150° C. for 2 minutes, then risen to 250° C. at a rate of 5° C./min, then risen to 300° C. at a rate of 10° C./min, and kept at 300° C. for 3 minutes.

Injection temperature: 280° C.

Detector temperature: 280° C.

Carrier gas: helium (at flow rate of 2 ml/min.)

[Synthesis of the Polyurethane]

To have a composition as shown in Table 1, first, PTMG2000 heated to a temperature of 80° C. was added to $H_{12}MDI$ heated to a temperature of 80° C. Then, dibutyl tin dilaurate (dibutyl tin dilaurate available from Aldrich, Inc.) of 0.005 mass % of the total material $H_{12}MDI$, PTMG200, and BD) was added thereto. Then, the mixture was stirred at a temperature of 80° C. for 2 hours under a nitrogen gas flow.

Under a nitrogen gas flow, BD heated to a temperature of 80° C. was added to the mixture, and the mixture was stirred at a temperature of 80° C. for 1 minute. Then, the reaction solution was cooled, and degassed under the reduced pressure for 1 minute at room temperature. After the degassing, the reaction solution was spread in a container, kept at a temperature of 110° C. for 6 hours under a nitrogen gas atmosphere to carry out a urethane reaction, thereby obtaining polyurethanes Nos. 1 to 9.

TABLE 1

| | Polyurethane No. | | | | | | | | |
|---|---|---|---|---|---|---|---|---|---|
| | 1 | 2 | 3 | 4 | 5 | 6 | 7 | 8 | 9 |
| PTMG 2000 (Molecular weight: 2000) | 1.0 | 1.0 | 1.0 | 1.0 | 1.0 | 1.0 | 1.0 | 1.0 | 1.0 |
| $H_{12}MDI$ (Molecular weight: 262) | 5.0 | 5.0 | 5.0 | 5.0 | 5.0 | 5.0 | 5.0 | 5.0 | 5.0 |
| (A) Cis-structure molecule | 4.0 | 3.5 | 3.0 | 2.5 | 2.0 | 1.5 | 1.0 | 0.5 | 0.0 |
| (B) Non-cis-structure molecule | 1.0 | 1.5 | 2.0 | 2.5 | 3.0 | 3.5 | 4.0 | 4.5 | 5.0 |
| BD (Molecular weight: 90) | 4.0 | 4.0 | 4.0 | 4.0 | 4.0 | 4.0 | 4.0 | 4.0 | 4.0 |

Composition: mole ratio

Notes on table 1

PTMG2000: Polytetramethylene ether glycol, PTMG-2000SN (Number average molecular weight 2000) available from HODOGAYA CHEMICAL Co., Ltd.

BD: 1,4-butanediol available from WAKO Pure Chemicals, Industries, Ltd.

[Production of the Golf Ball]

(1) Preparation of the Center

The center rubber composition having formulation shown in Table 2 were kneaded and pressed in upper and lower molds, each having a hemispherical cavity, at a temperature of 170° C. for 15 minutes to obtain the center with a spherical shape having a diameter of 38.5 mm and a mass of 34.9 g.

TABLE 2

| | Center | Amount (parts) |
|---|---|---|
| Center rubber Composition | Polybutadiene rubber | 100 |
| | Zinc acrylate | 35 |
| | Zinc oxide | 5 |
| | Diphenyl disulfide | 0.5 |
| | Dicumyl peroxide | 1 |
| Properties | Center hardness of center (Shore D) | 40 |

Notes on Table 2

Polybutadiene rubber: BR730 (high cis-polybutadiene) manufactured by JSR Corporation Zinc acrylate: ZNDA-90S manufactured by NIHON JYORYU KOGYO Co,. LTD.

Zinc oxide: Ginrei R manufactured by Toho-Zinc Co.

Dicumyl peroxide: Percumyl D manufactured by NOF Corporation

Diphenyl disulfide: manufactured by Sumitomo Seika Chemicals Company Limited (2) Materials for Intermediate Layer and Cover Composition Next, the materials for the intermediate layer and the cover compositions shown in Tables 3 and 4 were respectively mixed by a twin-screw kneading extruder to prepare an intermediate layer material and a cover composition in the form of pellet. Extrusion was performed in the following conditions: screw diameter=45 mm; screw revolutions=200 rpm; and screw L/D=35. The mixtures were heated to a temperature ranging from 150° C. to 230° C. at a die position of the extruder.

TABLE 3

|  | Intermediate layer | Amount (parts) |
|---|---|---|
| Intermediate layer composition | HIMILAN 1605 | 50 |
|  | HIMILAN AM7329 | 50 |
| Properties | Slab hardness (Shore D) | 64 |

Notes on table 3:
Himilan 1605: sodium ion-neutralized ethylene-methacrylic acid copolymerized ionomer resin manufactured by MITSUI-DUPONT POLYCHEMICAL CO., LTD.
Himilan AM7329: zinc ion-neutralized ethylene-methacrylic acid copolymerized ionomer resin manufactured by MITSUI-DUPONT POLYCHEMICAL CO., LTD.

The obtained intermediate layer material was injection molded on the center which had been obtained as described above, to prepare a core consisting of the center and the intermediate layer (a thickness of 1.6 mm) covering the center.

(3) Molding of Half Shells

Compression molding of half shells were performed by, charging one pellet of the cover composition obtained as described above into each of depressed parts of lower molds for molding half shells, and applying pressure to mold half shells. Compression molding was performed at a temperature of 160° C. for 5 minutes under a molding pressure of 2.94 MPa.

(4) Molding of the Cover

The core obtained in (2) was covered with the two half shells obtained in (3) in a concentric manner, and the cover (a thickness of 0.5 mm) was molded by compression molding. Compression molding was performed at a temperature of 150° C. for 2 minutes under a molding pressure of 9.8 MPa.

The surface of the obtained golf ball body was subjected to a sandblast treatment, and marking, and then clear paint was applied thereto and dried in an oven at a temperature of 40° C. to obtain a golf ball having a diameter of 42.7 mm and a weight of 45.3 g. Abrasion-resistance and spin performance of the obtained golf ball were evaluated, and a result thereof is shown in Table 4.

TABLE 4

|  |  | Golf ball No. | | | | | | | | |
|---|---|---|---|---|---|---|---|---|---|---|
|  |  | 1 | 2 | 3 | 4 | 5 | 6 | 7 | 8 | 9 |
| Cover composition | Polyurethane (parts) |  |  |  |  | 100 |  |  |  |  |
|  | Kind (No.) | No. 1 | No. 2 | No. 3 | No. 4 | No. 5 | No. 6 | No. 7 | No. 8 | No. 9 |
|  | (B)/(A) molar ratio in $H_{12}MDI$ | 2/8 | 3/7 | 4/6 | 5/5 | 6/4 | 7/3 | 8/2 | 9/1 | 10/0 |
|  | Titanium dioxide (parts) |  |  |  |  | 4 |  |  |  |  |
| Golf Ball Property | Abrasion-resistance | 0 | 0 | 0 | 0 | 0 | 1 | 2 | 3 | 6 |
|  | Spin rate (rpm) | 6400 | 6800 | 6900 | 7000 | 7100 | 7100 | 7100 | 7100 | 7100 |

Formulation: parts by mass

Golf balls Nos. 2 to 8 contain, as a polyisocyanate component constituting the polyurethane, $H_{12}MDI$ having a mole ratio ((B)/(A)) of non-cis-structure molecule (B) to cis-structure molecule (A) in a range from 3/7 to 9/1. It is seen that these golf balls Nos. 2 to 8 have the excellent abrasion-resistance and spin performance. On the other hand, golf ball No. 1 contains, as a polyisocyanate component constituting the polyurethane, $H_{12}MDI$ having a mole ratio ((B)/(A)) of non-cis-structure molecule (B) to cis-structure molecule (A) which is smaller than 3/7, as in conventional polyurethanes. Golf ball No. 1 has excellent abrasion-resistance but has insufficient in spin performance. In addition, golf ball No. 9 containing $H_{12}MDI$ having a mole ratio ((B)/(A)) larger than 9/1 has excellent spin performance but has insufficient abrasion-resistance.

The present invention is useful as a golf ball having a polyurethane cover which has excellent spin performance and abrasion-resistance. This application is based on Japanese Patent application Nos. 2007-311172 filed on Nov. 30, 2007, the contents of which are hereby incorporated by reference.

What is claimed is:

1. A golf ball comprising:
   a core;
   a cover covering the core and containing polyurethane as a resin component,
   wherein the polyurethane comprises 4,4'-dicyclohexylmethane diisocyanate having a molar ratio ((B)/(A)) of non-cis-structure molecule (B) to cis-structure molecule (A) in a range from 3/7 to 6/4 as a polyisocyanate component constituting the polyurethane; and
   polyol having a molecular weight of 800 or less as a chain extender component constituting the polyurethane.

2. The golf ball according to claim 1, wherein the polyurethane is obtained using 4,4'-dicyclohexylmethane diisocyanate having a mole ratio ((B)/(A)) of non-cis-structure molecule (B) to cis-structure molecule (A) in a range from 5/5 to 6/4 as the polyisocyanate component constituting the polyurethane.

3. The golf ball according to claim 1, wherein the polyisocyanate component contains the 4,4'-dicyclohexylmethane diisocyanate in an amount of 5 mass % or higher.

4. The golf ball according to claim 1, wherein the polyisocyanate component contains the 4,4'-dicyclohexylmethane diisocyanate in an amount of 50 mass % or higher.

5. The golf ball according to claim 1, wherein the polyisocyanate component essentially consists of the 4,4'-dicyclohexylmethane diisocyanate.

6. The golf ball according to claim 1, wherein the polyurethane contains polytetramethylene ether glycol having a number average molecular weight of from 400 to 10,000 as a polyol component constituting the polyurethane.

7. The golf ball according to claim 1, wherein the polyurethane contains 1,4-butanediol as a chain extender component constituting the polyurethane.

8. A golf ball comprising:
   a core;
   a cover covering the core and containing polyurethane as a resin component,
   wherein the polyurethane comprises
   4,4'-dicyclohexylmethane diisocyanate having a molar ratio ((B)/(A)) of non-cis-structure molecule (B) to cis-structure molecule (A) in a range from 3/7 to 6/4 as a polyisocyanate component constituting the polyurethane,
   polytetramethylene ether glycol as a polyol component constituting the polyurethane; and polyol having a molecular weight of 800 or less as a chain extender component constituting the polyurethane.

9. The golf ball according to claim 8, wherein the polyurethane is obtained using 4,4'-dicyclohexylmethane diisocyanate having a mole ratio ((B)/(A)) of non-cis-structure molecule (B) to cis-structure molecule (A) in a range from 5/5 to 6/4 as the polyisocyanate component constituting the polyurethane.

10. The golf ball according to claim 9, wherein the polyisocyanate component contains the 4,4'-dicyclohexylmethane diisocyanate in an amount of 5 mass % or higher.

11. The golf ball according to claim 9, wherein the polyisocyanate component contains the 4,4'-dicyclohexylmethane diisocyanate in an amount of 50 mass % or higher.

12. The golf ball according to claim 9, wherein the polyisocyanate component essentially consists of the 4,4'-dicyclohexylmethane diisocyanate.

13. The golf ball according to claim 12, wherein the polyurethane contains 1,4-butanediol as a chain extender component constituting the polyurethane.

\* \* \* \* \*